(12) United States Patent
Park et al.

(10) Patent No.: US 10,091,640 B2
(45) Date of Patent: Oct. 2, 2018

(54) METHOD AND APPARATUS FOR PERFORMING REGISTRATION TO NAN PROXY SERVER IN WIRELESS COMMUNICATION SYSTEM

(71) Applicant: LG ELECTRONICS INC., Seoul (KR)

(72) Inventors: Hyunhee Park, Seoul (KR); Byungjoo Lee, Seoul (KR); Dongcheol Kim, Seoul (KR); Giwon Park, Seoul (KR); Taesung Lim, Seoul (KR); Youngjun Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/567,027

(22) PCT Filed: Apr. 25, 2016

(86) PCT No.: PCT/KR2016/004290
§ 371 (c)(1),
(2) Date: Oct. 16, 2017

(87) PCT Pub. No.: WO2016/171527
PCT Pub. Date: Oct. 27, 2016

(65) Prior Publication Data
US 2018/0098211 A1 Apr. 5, 2018

Related U.S. Application Data

(60) Provisional application No. 62/151,946, filed on Apr. 23, 2015, provisional application No. 62/183,200, (Continued)

(51) Int. Cl.
*H04W 60/00* (2009.01)
*H04W 8/06* (2009.01)
(Continued)

(52) U.S. Cl.
CPC ............... *H04W 8/06* (2013.01); *H04W 8/08* (2013.01); *H04W 60/06* (2013.01); *H04W 84/18* (2013.01)

(58) Field of Classification Search
CPC ....... H04W 60/06; H04W 84/18; H04W 8/06; H04W 8/08; H04W 60/00; H04W 8/005; (Continued)

(56) References Cited

U.S. PATENT DOCUMENTS 9,693,217 B2 * 6/2017 Kasslin ................ H04W 8/005
2013/0227152 A1 8/2013 Lee et al.
(Continued)

FOREIGN PATENT DOCUMENTS

KR 10-2010-0127812 A 12/2010
WO 2014/089252 A1 6/2014

*Primary Examiner* — Nathan Taylor
(74) *Attorney, Agent, or Firm* — Dentons US LLP

(57) ABSTRACT

The present specification relates to a method for a NAN proxy client to perform registration to a NAN proxy server in a wireless communication system. The method for a NAN proxy client to perform registration to a NAN proxy server may comprising: transmitting a subscribe message regarding proxy service search to the NAN proxy server; receiving a publish message from the NAN proxy server; transmitting a proxy registration request message to the NAN proxy server on the basis of proxy service; and receiving a proxy registration response message on the basis of the proxy registration request message.

15 Claims, 13 Drawing Sheets

Related U.S. Application Data filed on Jun. 23, 2015, provisional application No. 62/193,571, filed on Jul. 16, 2015.

(51) Int. Cl.
*H04W 84/18* (2009.01)
*H04W 60/06* (2009.01)
*H04W 8/08* (2009.01)

(58) Field of Classification Search
CPC ... H04W 48/16; H04W 88/182; H04W 76/10; H04W 84/12; H04W 4/06; H04W 52/0216; H04W 76/14; H04W 12/02; H04W 12/06; H04W 48/08; H04W 48/12; H04W 4/008; H04W 4/023; H04W 4/12
USPC .................................. 455/433; 370/311, 338
See application file for complete search history.

(56) References Cited

U.S. PATENT DOCUMENTS

| | | |
|---|---|---|
| 2015/0036540 A1 | 2/2015 | Kasslin et al. |
| 2015/0081840 A1 | 3/2015 | Patil et al. |
| 2016/0205533 A1* | 7/2016 | Tsai ........................ H04L 67/16 370/311 |
| 2016/0226928 A1* | 8/2016 | Park .................... H04L 65/1073 |
| 2016/0270137 A1* | 9/2016 | Yong ..................... H04W 8/005 |
| 2016/0285630 A1* | 9/2016 | Abraham ............. H04L 9/0861 |
| 2016/0352782 A1* | 12/2016 | Patil ....................... H04L 65/105 |
| 2016/0352842 A1* | 12/2016 | Patil ....................... H04L 67/16 |
| 2016/0353269 A1* | 12/2016 | Kasslin ................ H04W 8/005 |
| 2017/0094497 A1* | 3/2017 | Aoki ....................... H04L 67/16 |
| 2017/0127344 A1* | 5/2017 | Liu ....................... H04W 48/16 |

\* cited by examiner

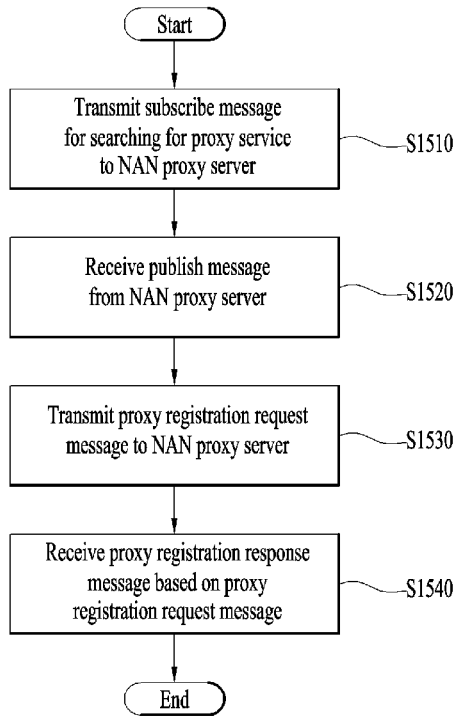
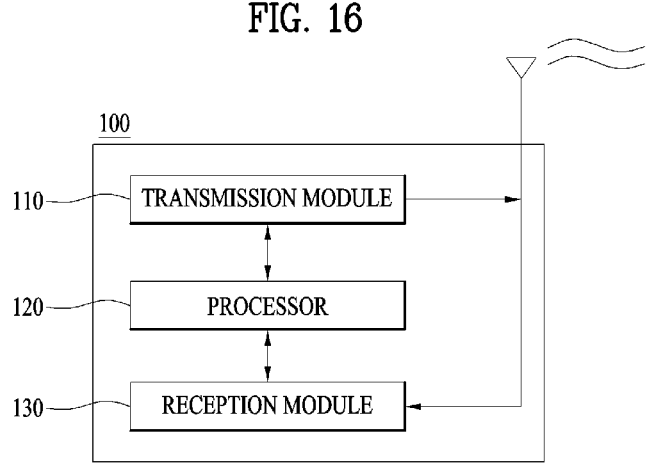

METHOD AND APPARATUS FOR PERFORMING REGISTRATION TO NAN PROXY SERVER IN WIRELESS COMMUNICATION SYSTEM

This application is a 35 USC § 371 National Stage entry of International Application No. PCT/KR2016/004290 filed on Apr. 25, 2016, and claims priority to U.S. Provisional Application Nos. 62/151,946 filed on Apr. 23, 2015; 62/183,200 filed on Jun. 23, 2015 and 62/193,571 filed on Jul. 16, 2015, all of which are hereby incorporated by reference in their entireties as if fully set forth herein.

TECHNICAL FIELD

The present specification relates to a wireless communication system and, more particularly, to a method and apparatus for performing registration with a NAN proxy server in a wireless communication system.

BACKGROUND ART

Wireless communication systems have been widely deployed to provide various types of communication services such as voice or data. In general, a wireless communication system is a multiple access system that supports communication with multiple users by sharing available system resources (bandwidth, transmission power, etc.). For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Along with advances in information communication technology, various wireless communication techniques have been developed. Thereamong, a wireless local area network (WLAN) enables users to wirelessly access the Internet through portable terminals such as personal digital assistants (PDAs), laptops, and portable multimedia players (PMPs) in homes, offices, or specific service areas, based on wireless frequency technology.

DETAILED DESCRIPTION OF THE INVENTION

Technical Problems

An object of the present specification is to provide a method and apparatus for performing registration with a NAN proxy server in a wireless communication system.

Another object of the present specification is to provide a method for a neighbor awareness networking (NAN) device to serve as a proxy server and a proxy client in a wireless communication system.

Another object of the present specification is to provide a NAN device serving as a proxy server, for performing data transmission and power saving functions.

Technical Solutions

According to an aspect of the present specification, provided herein is a method of performing registration with a neighbor awareness networking (NAN) proxy server by a NAN proxy client in a wireless communication system. The method includes transmitting a subscribe message for proxy service search to the NAN proxy server, receiving a publish message from the NAN proxy server, wherein the publish message is a message indicating that a proxy service is supported by the NAN proxy server, transmitting a proxy registration request message to the NAN proxy server based on the proxy service, and receiving a proxy registration response message based on the proxy registration request message, wherein, upon receiving the proxy registration response message, the NAN proxy client is registered with the NAN proxy server, and the registered NAN proxy client is awoken based on a first discovery window interval.

According to another aspect of the present specification, provided herein is a neighbor awareness networking (NAN) proxy client for performing registration with a NAN proxy server in a wireless communication system. The NA proxy server includes a reception module configured to receive information from an external device, a transmission module configured to transmit information to an external device, and a processor configured to control the reception module and the transmission module, wherein the processor transmits a subscribe message for proxy service search to the NAN proxy server, receives a publish message from the NAN proxy server, the publish message being a message indicating that a proxy service is supported by the NAN proxy server, transmits a proxy registration request message to the NAN proxy server based on the proxy service, receives a proxy registration response message based on the proxy registration request message, and wherein the NAN proxy client is registered with the NAN proxy server upon receiving the proxy registration response message, and the registered NAN proxy client is awoken based on a first discovery window interval.

The followings may be commonly applied to the method and NAN device for performing registration with the proxy server in the wireless communication system In accordance with an embodiment of the present specification, information about the first discovery window interval may be included in the proxy registration request message and may be transmitted to the NAN proxy server.

In accordance with an embodiment of the present specification, the NAN proxy server may be awoken based on a second discovery window interval, and the first discovery window interval may be set to a multiple of an integer of the second discovery window interval.

In accordance with an embodiment of the present specification, the proxy registration response message may include at least one of information indicating whether registration is permitted and information about a registration identification (ID).

In accordance with an embodiment of the present specification, upon completing registration of the NAN proxy client, the NAN proxy server may perform publish and subscribe functions of the NAN proxy client in place of the NAN proxy client.

In accordance with an embodiment of the present specification, the NAN proxy client registered with the NAN proxy server may perform a procedure of deregistration.

In accordance with an embodiment of the present specification, the procedure of deregistration may include transmitting a deregistration request message to the NAN proxy server, and receiving a deregistration response message from the NAN proxy server.

In accordance with an embodiment of the present specification, the NAN proxy client may be deregistered from the NAN proxy server and provide information about deregistration to other NAN proxy clients registered with the NAN proxy server when the NAN proxy server is unavailable.

In accordance with an embodiment of the present specification, the NAN proxy client may receive a first frame including information about capabilities of the proxy server from the NAN proxy server.

In accordance with an embodiment of the present specification, the first frame may be one of a NAN beacon frame and a NAN service discovery frame.

In accordance with an embodiment of the present specification, the first frame may include a NAN proxy server attribute field including at least one of a proxy server address field, a proxy server capability field, an awake interval field, and a basic server set (BSS) ID field.

In accordance with an embodiment of the present specification, the NAN proxy client may transmit a second frame including information about capabilities of the proxy client to the NAN proxy server upon receiving the first frame, and the second frame may include a NAN proxy client attribute field including at least one of a proxy client address field, a proxy server address field, an awake interval field, and a basic server set (BSS) ID field.

In accordance with an embodiment of the present specification, the registered NAN proxy client may receive a first frame from the NAN proxy server in a discovery window awoken based on the first discovery window interval and perform synchronization with the NAN proxy server based on the first frame.

In accordance with an embodiment of the present specification, the NAN proxy client may transmit a second frame to the NAN proxy server based on the first frame, and the second frame may include information indicating that registration of the NAN proxy client is maintained.

Advantageous Effects

In accordance with the present specification, a method and apparatus for performing registration with a NAN proxy server in a wireless communication system are provided.

In accordance with the present specification, a method for a neighbor awareness networking (NAN) device to serve as a proxy server and a proxy client in a wireless communication system is provided.

In accordance with the present specification, a NAN device serving as a proxy server can perform data transmission and power saving functions.

Effects according to the present specification are not limited to what has been particularly described hereinabove and other advantages not described herein will be more clearly understood by persons skilled in the art from the following detailed description of the present invention.

DESCRIPTION OF DRAWINGS

FIG. 15 is a flowchart illustrating a method of performing a proxy role.

FIG. 16 is a block diagram of a device.

BEST MODE FOR CARRYING OUT THE INVENTION

Figure 1:
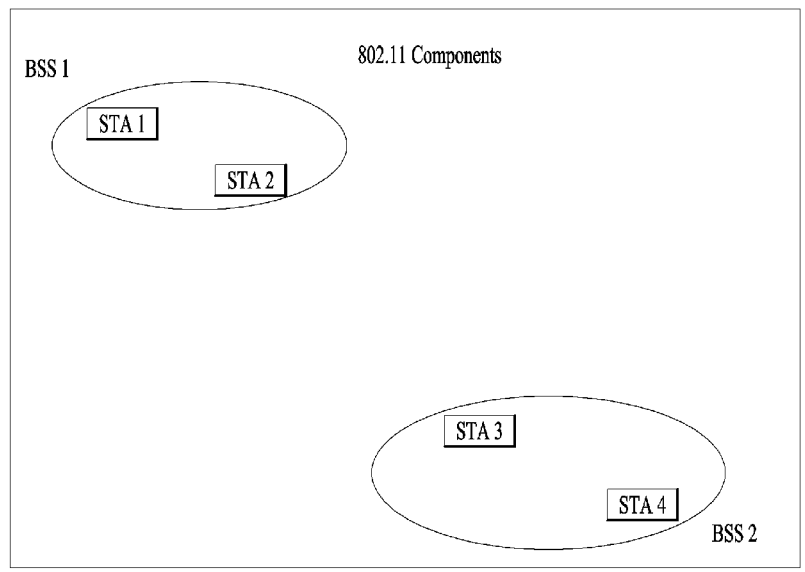
FIG. 1 is a diagram illustrating an exemplary structure of an IEEE 802.11 system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

Structure of WLAN System

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the above-mentioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs in place of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME_GET/SET primitives through an MLME SAP (service access point). Furthermore, various PLME_GET/SET primitives may be exchanged between the PLME and the SME through PLME_SAP and may be exchanged between the MLME and the PLME through an MLME-PLME_SAP.

NAN (Neighbor Awareness Network) Topology

Figure 2:
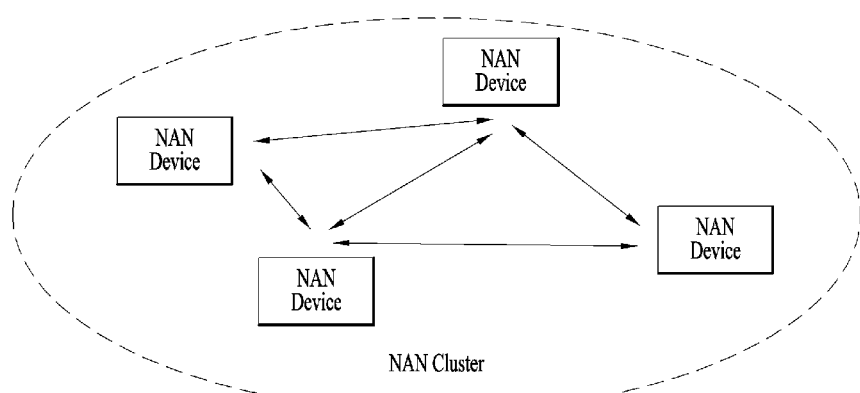
FIGS. 2 and 3 are diagrams illustrating exemplary NAN clusters.
Figure 3:
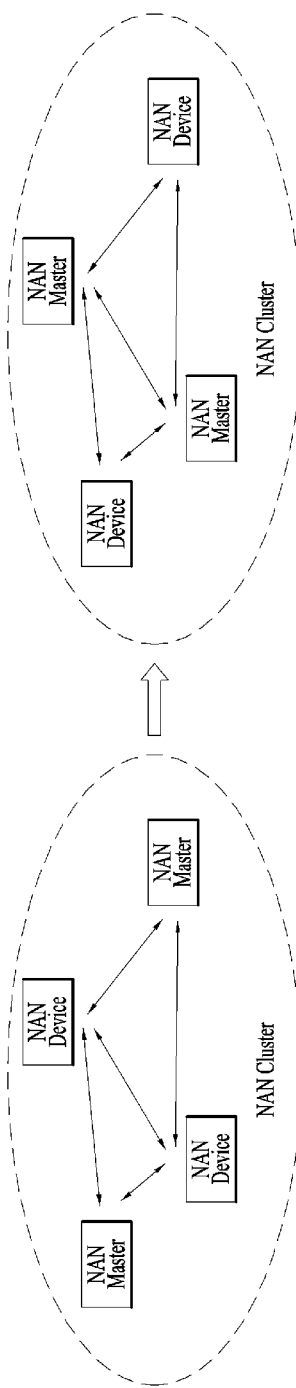

A NAN network can be constructed with NAN devices (devices) that use a set of identical NAN parameters (e.g., a time interval between consecutive discovery windows, an interval of a discovery window, a beacon interval, a NAN channel, etc.). A NAN cluster can be formed by NAN devices and the NAN cluster means a set of NAN devices that are synchronized on the same discovery window schedule. And, a set of the same NAN parameters is used in the NAN cluster. FIG. 2 illustrates an example of the NAN cluster. A NAN device included in the NAN cluster may directly transmit a multicast/unicast service discovery frame to a different NAN device within a range of the discovery window. As shown in FIG. 3, at least one NAN master may exist in a NAN cluster and the NAN master may be changed. Moreover, the NAN master may transmit all of a synchronization beacon frame, discovery beacon frame and service discovery frame.

NAN Device Architecture

Figure 4:
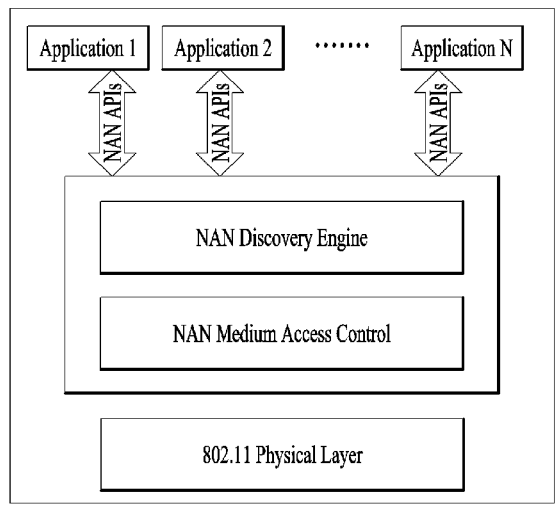
FIG. 4 illustrates a structure of a NAN device.

FIG. 4 illustrates an example of a structure of a NAN device (device). Referring to FIG. 4, the NAN device is based on a physical layer in 802.11 and its main components correspond to a NAN discovery engine, a NAN MAC (medium access control), and NAN APIs connected to respective applications (e.g., Application 1, Application 2, . . . , Application N).

Figure 5:
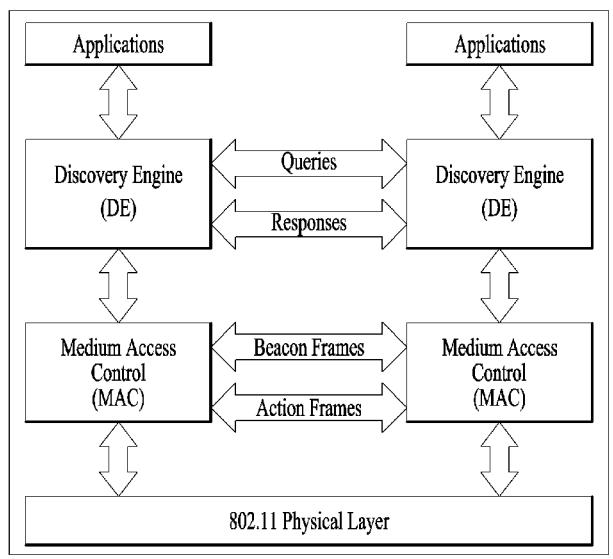
FIGS. 5 and 6 illustrate relations between NAN components.
Figure 6:
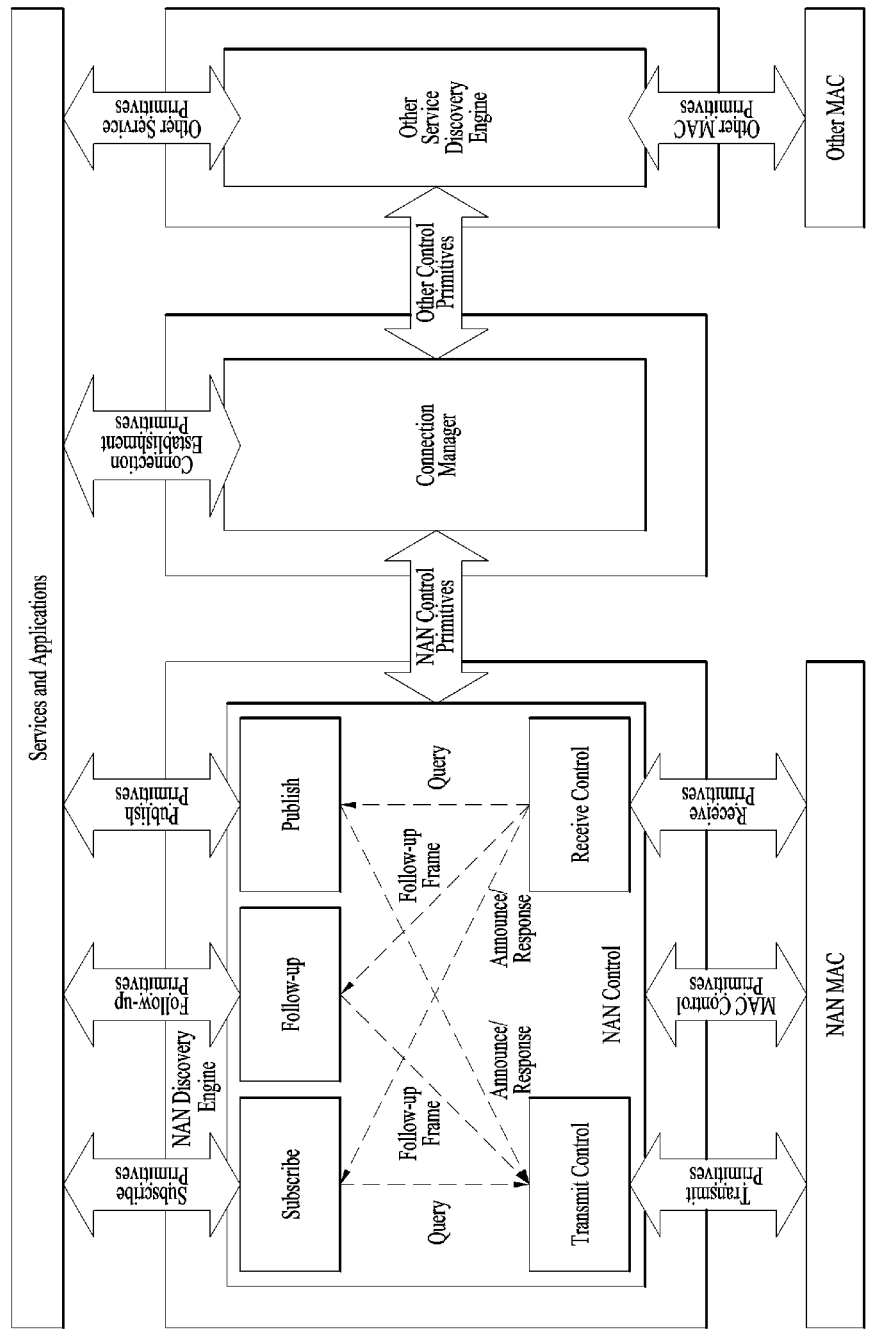

FIGS. 5 and 6 illustrate relations between NAN components. Service requests and responses are processed through the NAN discovery engine, and the NAN beacon frames and the service discovery frames are processed by the NAN MAC. The NAN discovery engine may provide functions of subscribing, publishing, and following-up. The publish/subscribe functions are operated by services/applications through a service interface. If the publish/subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN Device

Figure 7:
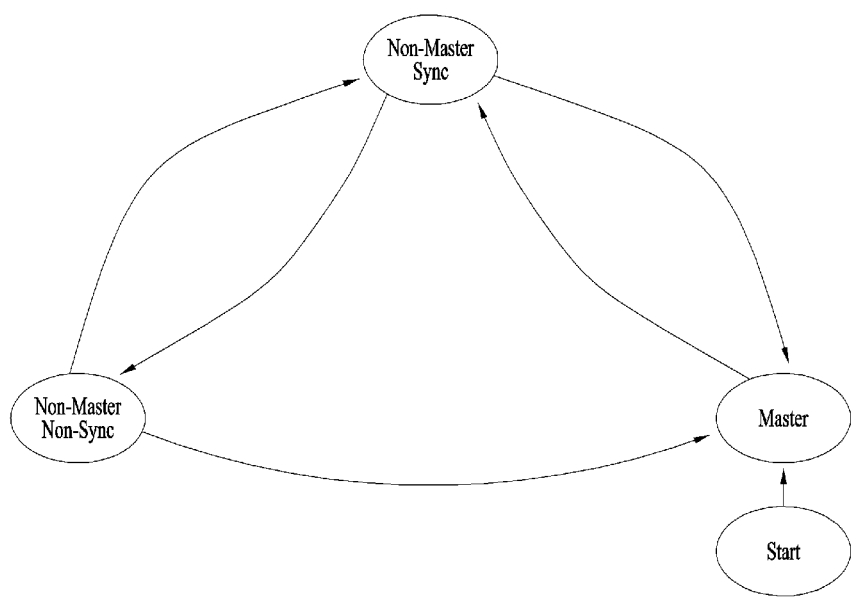
FIG. 7 is a diagram illustrating state transition of a NAN device.

As mentioned in the foregoing description, a NAN device (device) can serve as a NAN master and the NAN master can be changed. In other words, roles and states of the NAN device can be shifted in various ways and related examples are illustrated in FIG. 7. The roles and states, which the NAN device can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1.

TABLE 1

| Role and State | Discovery Beacon | Synchronization Beacon |
| --- | --- | --- |
| Master | Transmission Possible | Transmission Possible |
| Non-Master Sync | Transmission Impossible | Transmission Possible |
| Non-Master Non-Sync | Transmission Impossible | Transmission Impossible |

The state of the NAN device can be determined according to a master rank (MR). The master rank indicates the preference of the NAN device to serve as the NAN master. In particular, a high master rank means strong preference for the NAN master. The NAN MR can be determined by Master Preference, Random Factor, Device MAC address, and the like according to Formula 1.

$$\text{MasterRank} = \text{MasterPreference} * 2^{56} + \text{RandomFactor} * 2^{48} + \text{MAC}[5] * 2^{40} + \ldots + \text{MAC}[0] \quad \text{[Formula 1]}$$

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
| --- | --- | --- | --- |
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device's preference to serve as the role of Master, with a larger value indicating a higher preference. |
| Random Factor | 1 | 0-255 | A random number selected by the sending NAN Device. |

Regarding the above MR, in case of a NAN device that activates a NAN service and initiates a NAN cluster, each of the Master Preference and the Random Factor is set to 0 and NANWarmUp is reset. The NAN device should set a Master Preference field value in the master indication attribute to a value greater than 0 and a Random Factor value in the master indication attribute to a new value until when the NANWarmUp expires. When a NAN device joins a NAN cluster in which the Master Preference of an anchor master is set to a value greater than 0, the corresponding NAN device may set the Master Preference to a value greater than 0 and the Random Factor to a new value irrespective of expiration of the NANWarmUp.

Moreover, a NAN device can become an anchor master of a NAN cluster depending on an MR value. That is, all NAN devices have capabilities of operating as the anchor master. The anchor master means the device that has a highest MR and a smallest AMBTT (anchor master beacon transmit time) value and has a hop count (HC) (to the anchor master) set to 0 in the NAN cluster. In the NAN cluster, two anchor masters may exist temporarily but a single anchor master is a principle of the NAN cluster. If a NAN device becomes an anchor master of a currently existing NAN cluster, the NAN device adopts TSF used in the currently existing NAN cluster without any change.

The NAN device can become the anchor master in the following cases: if a new NAN cluster is initiated; if the master rank is changed (e.g., if an MR value of a different NAN device is changed or if an MR value of the anchor master is changed); or if a beacon frame of the current anchor master is not received any more. In addition, if the MR value of the different NAN device is changed or if the MR value of the anchor master is changed, the NAN device may lose the status of the anchor master. The anchor master can be determined according to an anchor master selection algorithm in the following description. In particular, the anchor master selection algorithm is the algorithm for determining which NAN device becomes the anchor master of the NAN cluster. And, when each NAN device joins the NAN cluster, the anchor master selection algorithm is driven.

If a NAN device initiates a new NAN cluster, the NAN device becomes the anchor master of the new NAN cluster. If a NAN synchronization beacon frame has a hop count in excess of a threshold, the NAN synchronization beacon frame is not used by NAN devices. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN device compares an anchor master rank value in the beacon frame with a stored anchor master rank value. If the stored anchor master rank value is greater than the anchor master value in the beacon frame, the NAN device discards the anchor master value in the beacon frame. If the stored anchor master value is less than the anchor master value in the beacon frame, the NAN device newly stores values greater by 1 than the anchor master rank and the hop count included in the beacon frame and an AMBTT value in the beacon frame. If the stored anchor master rank value is equal to the anchor master value in the beacon frame, the NAN device compares hop counters. Then, if a hop count value in the beacon frame is greater than a stored value, the NAN device discards the received beacon frame. If the hop count value in the beacon frame is equal to (the stored value−1) and if an AMBTT value is greater than the stored value, the NAN device newly stores the AMBTT value in the beacon frame. If the hop count value in the beacon frame is less than (the stored value−1), the NAN device increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN device exceeds the stored AMBTT value by more than 16*512 TUs (e.g., 16 DW periods), the NAN device may assume itself as an anchor master and then update an anchor master record. In addition, if any of MR related components (e.g., Master Preference, Random Factor, MAC Address, etc.) is changed, a NAN device not corresponding to the anchor master compares the changed MR with a stored value. If the changed MR of the NAN device is greater than the stored value, the corresponding NAN device may assume itself as the anchor master and then update the anchor master record.

Moreover, a NAN device may set anchor master fields of the cluster attributes in the NAN synchronization and discovery beacon frames to values in the anchor master record, except that the anchor master sets the AMBTT value to a TSF value of corresponding beacon transmission. The NAN device, which transmits the NAN synchronization beacon frame or the discovery beacon frame, may be confirmed that the TSF in the beacon frame is derived from the same anchor master included in the cluster attribute.

Moreover, a NAN device may adopt a TSF timer value in a NAN beacon received with the same cluster ID in the following case: i) if the NAN beacon indicates an anchor master rank higher than a value in an anchor master record of the NAN device; or ii) if the NAN beacon indicates an anchor master rank equal to the value in the anchor master record of the NAN device and if a hop count value and an AMBTT value in the NAN beacon frame are larger values in the anchor master record.

NAN Synchronization

NAN devices (devices) participating in the same NAN Cluster may be synchronized with respect to a common clock. A TSF in the NAN cluster can be implemented through a distributed algorithm that should be performed by all the NAN devices. Each of the NAN devices participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN devices may transmit synchronization beacon frames in order to help all NAN devices in the NAN cluster synchronize their own clocks.

NAN beacon transmission is distributed. A NAN beacon frame is transmitted during a DW period existing at every 512 TU. All NAN devices can participate in generation and transmission of the NAN beacon according to their roles and states. Each of the NAN devices should maintain its own TSF timer used for NAN beacon period timing. A NAN synchronization beacon interval can be established by the NAN device that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
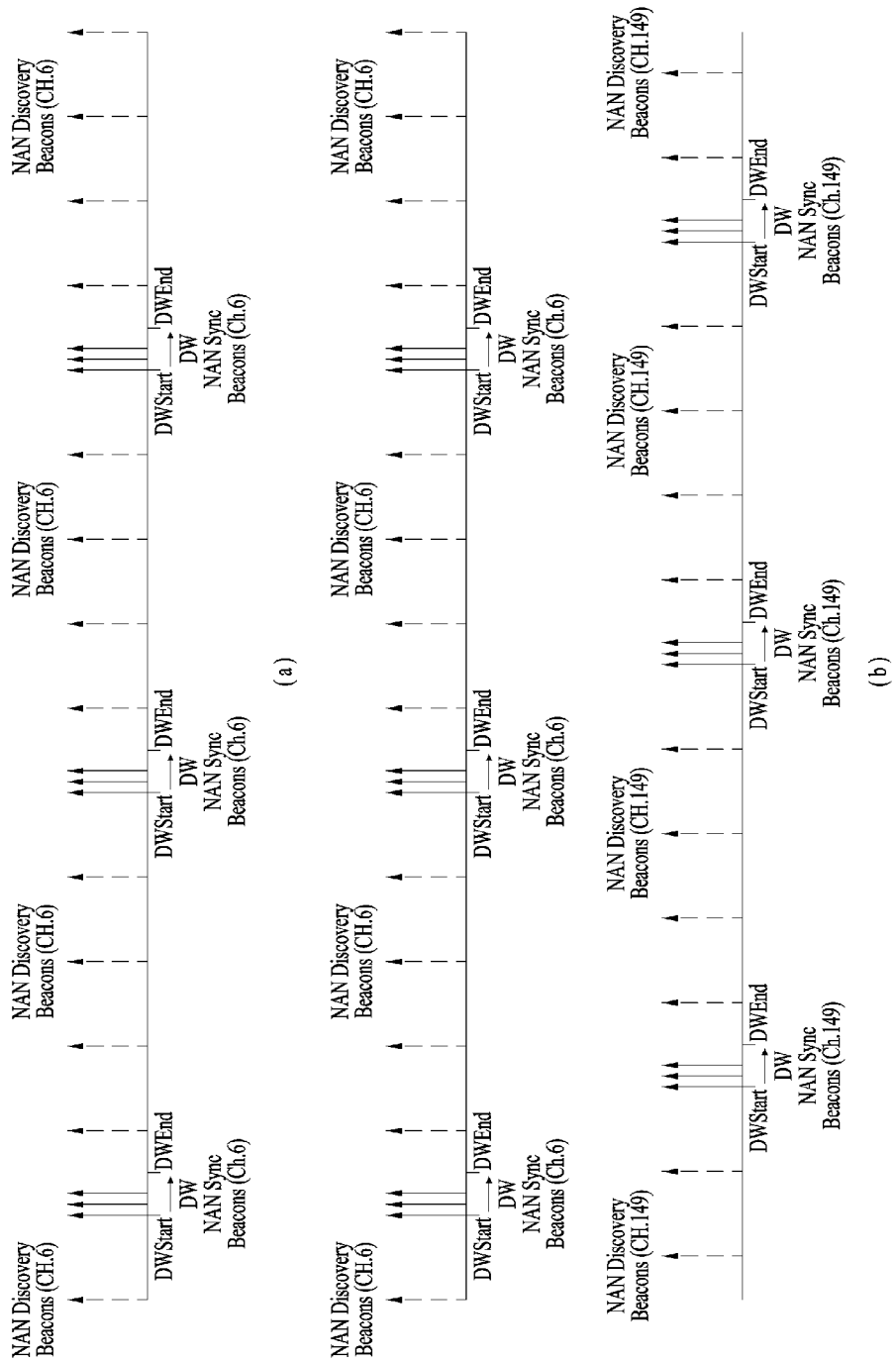
FIG. 8 is a diagram illustrating a discovery window.

Each NAN device serving as a NAN master transmits a NAN discovery beacon frame from out of a NAN discovery window. On average, the NAN device serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN device participates, the NAN device serving as the NAN master is able to omit transmission of the NAN discovery beacon frame. In order to minimize power required to transmit the NAN discovery beacon frame, the NAN device serving as the NAN master may use AC_VO (WMM Access Category—Voice) contention setting. FIG. 8 illustrates relations between a discovery window and a NAN discovery beacon frame and transmission of NAN synchronization/discovery beacon frames. Particularly, FIG. 8 (a) shows transmission of NAN discovery and synchronization beacon frames of a NAN device operating in 2.4 GHz band. FIG. 8 (b) shows transmission of NAN discovery and synchronization beacon frames of a NAN device operating in 2.4 GHz and 5 GHz bands.

Figure 9:
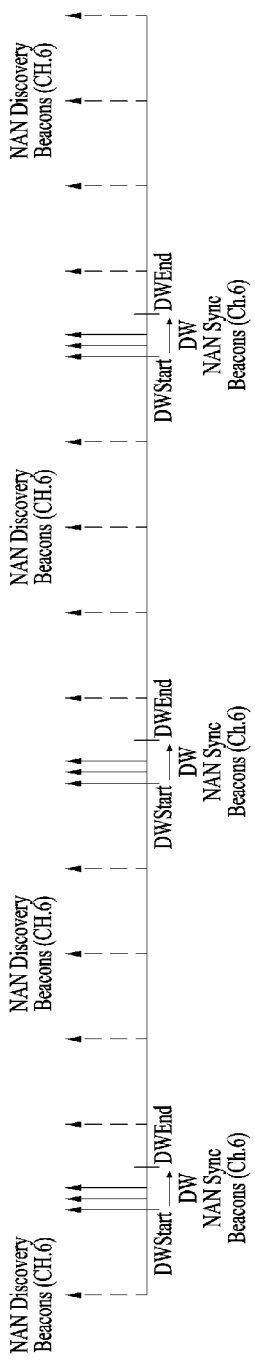
FIG. 9 is a diagram illustrating a discovery window.

FIG. 9 is a diagram illustrating a discovery window. As mentioned in the foregoing description, each NAN device performing a master role transmits a synchronization beacon frame within a discovery window and transmits a discovery beacon frame at the outside of the discovery window. In this case, as mentioned in the foregoing description, the discovery window can be repeated in every 512 TU. In this case, duration of the discovery window may correspond to 16 TUs. In particular, the discovery window can last during 16 TUs. In this case, for example, all NAN devices belonging to a NAN cluster may awake at every discovery window to receive a synchronization beacon frame from a master NAN device. By doing so, the NAN cluster can be maintained. In this case, if all NAN devices awake at every discovery window in a fixed manner, power consumption of the devices may get worse. Hence, it is necessary to have a method of reducing power consumption by dynamically controlling duration of a discovery window while synchronization is maintained in a NAN cluster.

For example, as mentioned in the foregoing description, a NAN device may operate in 2.4 GHz band or 5 GHz band. As a different example, a NAN device may operate in sub 1 GHz band. For example, a NAN device can be configured to support IEEE 802.11ah that supports sub 1 GHz band. For example, if a NAN device supports 900 MHz, it may have link quality and a physical model different from link quality and a physical model in 2.4 GHz or 5 GHz.

For example, if a NAN device supports 900 MHz, the NAN device can send a signal farther and perform communication in a wider range. In this case, data communication can be performed between NAN devices and data can be exchanged between NAN devices. In this case, since the data exchange is performed based on the data communication, a problem may exist in efficiently managing power in the NAN device. In order to solve the problem, it may differently configure a method of configuring a discovery window period. FIG. 9 shows a basic structure that a synchronization beacon frame is transmitted within a discovery window and a discovery beacon frame is transmitted at the outside of the discovery window. The basic structure can also be similarly applied to a NAN device supporting 900 MHz band.

Figure 10:
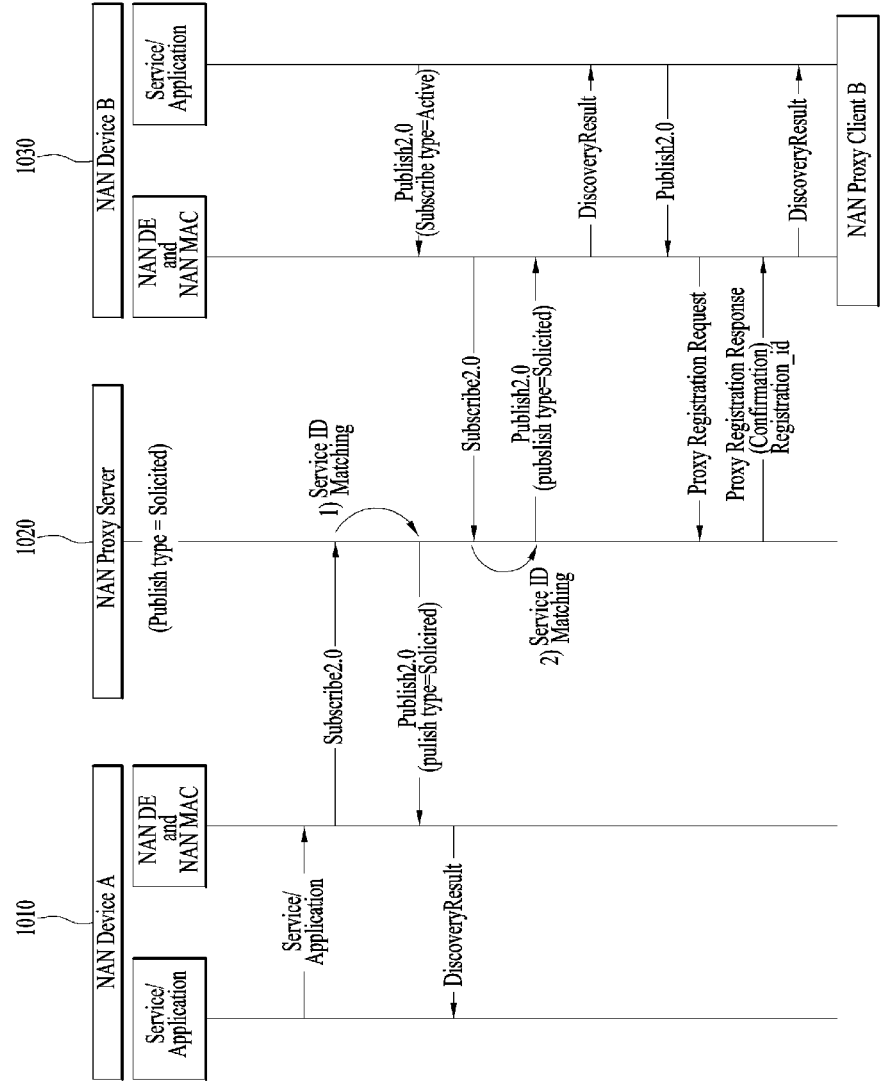
FIG. 10 is a diagram illustrating a method for a NAN device to be registered with a NAN proxy server as a NAN proxy client.

FIG. 10 is a diagram illustrating a method for a NAN device to be registered with a NAN proxy server as a NAN proxy client.

As described above, NAN devices may perform data communication. NAN devices may be awoken in discovery windows and may receive frames. Herein, if all NAN devices are awoken in all discovery windows and perform a procedure for performing data communication, considerable power may be consumed.

Accordingly, as a method of reducing power consumption of a NAN device, a NAN proxy device may be defined as a new role (concept) of the NAN device. For example, the NAN proxy device may be a NAN proxy server or a NAN proxy client. In this case, the NAN proxy server may perform a procedure of data communication in place of the NAN proxy client. For example, the NAN proxy server may perform publishing and/or subscribing in place of the NAN proxy client. More specifically, the NAN proxy server may provide other NAN devices with information that the NAN proxy client provides in order to perform data communication with other NAN devices. That is, the NAN proxy server may perform a procedure of data communication in place of the NAN proxy client in order to reduce power consumption of the NAN proxy client.

For example, the NAN proxy server may be a device that is insensitive to power consumption. In addition, the NAN proxy client may be a device operating at low power. In this situation, if the NAN proxy client is awoken in every discovery window like a legacy NAN device, substantial power is consumed, thereby causing inconvenience. Therefore, by causing a device insensitive to power consumption to perform a procedure for data communication, power consumption is reduced and data communication is efficiently performed.

In order for the NAN proxy server to perform the procedure for data communication in place of the NAN proxy client, it is necessary to acquire information about the NAN proxy client. To this end, the NAN proxy client needs to be registered with the NAN proxy server. Hereinafter, a method of registering the NAN proxy client with the NAN proxy server will be described.

In more detail, a NAN device functioning as a proxy server may be a NAN proxy server. The NAN proxy server may provide other NAN devices with information indicating that the NAN proxy server can serve as a NAN proxy server. For example, the NAN proxy server may include information about a role of the NAN proxy server in a broadcast message. Other NAN devices may identify the NAN proxy server based on the broadcast message. Alternatively, the NAN proxy server may provide information indicating the role of the NAN proxy server to other NAN devices as a publish message. However, the present invention is not limited to the above-described embodiment.

If NAN devices 1010 and 1030 identify a NAN proxy server 1020, the NAN devices 1010 and 1030 may transmit a subscribe message to the NAN proxy server 1020 in order to search for a service of the NAN proxy server 1020.

More specifically, the NAN devices 1010 and 1030 may have the layered structure described above. A service/application end of the first NAN device 1010 (NAN Device A) may provide a subscribe method to a discovery engine (DE) and a NAN MAC end of the first NAN device 1010.

For example, primitives of the subscribe method provided by the service/application end to the NAN DE and NAN MAC end may be as indicated in Table 3 below. That is, the service/application end may provide information of Table 3 to the NAN DE and NAN MAC end. More specifically, the service/application end may provide information about a service name that a NAN device desires to search for, service specific information, and information about configuration parameters to the NAN DE and NAN MAC end.

Further, other additional information may be included in the primitives of the subscribe method and the present invention is not limited to the above-described embodiment.

TABLE 3

Subscribe(service_name, service_specific_info, configuration_parameters)

service_name:
    UTF-8 name string which identifies the service/application
service_specific_info:
    Sequence of values which further specify the published service beyond the service name
    configuration_parameters
        Subscribe type
            Active
        Query period
            Recommended periodicity of query transmissions
        Time to live
            The instance of the Subscribe function can be commanded to run for a given time interval or until the first DiscoveryResult event Next, the first NAN device 1010 may transmit the subscribe message to the NAN proxy server 1020. That is, the first NAN device 1010 may transmit the subscribe message to the NAN proxy server 1020 based on the subscribe method, for active subscribing.

Thereafter, if the NAN proxy server 1020 should respond to the subscribe message, the NAN proxy server 1020 may match an ID of a service that can be provided by the NAN proxy server 1020 to transmit a publish message to the first NAN device 1010. In this case, a publish type of the publish message may be "Solicited".

Herein, a service/application end of the NAN proxy server 1020 may provide a publish method to a NAN DE and a NAN MAC end of the NAN proxy server 1020. Primitives of the publish method may be, for example, as follows.

That is, the service/application end of the NAN proxy server 1020 may provide the information of Table 4 to the NAN DE and NAN MAC end. More specifically, the service/application end may provide information about a service name supported by the NAN proxy server 1020, service specific information, and information about configuration parameters to the NAN DE and NAN MAC end.

The information about the configuration parameters may include information about a publish type indicating that solicited transmission is performed. In addition, the information about the configuration parameters may include information about a solicited transmission type indicating that solicited transmission is unicast transmission or broadcast transmission. As information about time during which a publish function is performed, information about time to live may be included in the information about the configuration parameters. Furthermore, information about event conditions indicating whether an event is generated may be included in the information about the configuration parameters.

Other additional information may be included in the primitives of the publish method and the present invention is not limited to the above-described embodiment.

TABLE 4

Publish( service_name, service_specific_info, configuration_parameters )

service_name:
    UTF-8 name string which identifies the service/application
service_specific_info:
    Sequence of values which should be conveyed to the Discovery Engine of a NAN Device that has invoked a Subscribe method corresponding to this Publish method
    configuration_parameters
        Publish type:
            Solicited transmissions only
        Solicited transmission type:
            Determines whether a solicited transmission is a unicast or a broadcast transmission
        Time to live:
            The instance of the Publish function can be commanded to run for a given time interval or for one transmission only
            Event conditions:
                Determines when Publish related events are generated. Events can be requested to be generated on each solicited transmission. Alternatively, no events are expected.

Next, when the first NAN device 1010 receives the publish message, the NAN DE and NAN MAC end of the first NAN device 1010 may provide a discovery result as an event to the service/application end of the first NAN device 1010. Thus, the first NAN device 1010 may end service search of the NAN proxy server 1020.

In this case, primitives of the discovery result event may be, for example, as indicated in Table 5 below.

More specifically, the NAN DE and NAN MAC end may provide the service/application end with the discovery result event including information about a subscribe ID for identifying a subscribe function, service_specific_info indicating specific service information supported by the NAN proxy server, publish_id information indicating a publish ID, and address information indicating an address of the proxy server.

Other additional information may be included in the primitives of the discovery result event and the present invention is not limited to the above-described embodiment.

TABLE 5

DiscoveryResult( subscribe_id, service_specific_info, publish_id, address )

subscribe_id:
    As originally returned by the instance of the Subscribe function
service_specific_info:
    Sequence of values which were decoded from a frame received from the Proxy server
publish_id:
    Identifier for the instance of the published service on a remote Proxy server
Address:
    NAN Interface Address of the Proxy Server The second NAN device 1030 (NAN Device B) may also search for the service of the NAN proxy server 1020 based on the same method used by the first NAN device 1010. In this case, service search for the NAN proxy server 1020 may be individually performed by each of the NAN devices 1010 and 1030.

For example, the service/application end of the second NAN device 1030 that has searched for the service of the NAN proxy server 1020 may provide the publish method to the NAN DE and NAN MAC end of the second NAN device 1030.

In this case, primitives used for the second NAN device 1030 to be registered with the NAN proxy server may be defined as indicated in Tables 6 and 7 below. More specifically the service/application end of the second NAN device 1030 may provide information about proxy registration as the publish method to the NAN DE and NAN MAC end of the second NAN device 1030 according to Tables 6 and 7. That is, the second NAN device 1030 may reuse the existing publish method and subscribe method to provide the information about proxy registration. If the existing publish method and subscribe method are reused, a service_specific_info field may include information for registration with the proxy server rather than information of the second NAN device 1030 for publishing. That is, the second NAN device 1030 may use a method in which information about registration is included using a format of the existing publish method and subscribe method.

TABLE 6

Publish (service_name, service_specific_info, configuration_parameters )

service_name:
    UTF-8 name string which identifies the service/application
service_specific_info:
    Sequence of values which should be conveyed to the Discovery Engine of a NAN Device that has invoked a Subscribe method corresponding to this Publish method.
    configuration_parameters
        Publish type:
            Solicited transmissions only and Unsolicited transmission only
        Solicited transmission type:
            Determines whether a solicited transmission is a unicast or a broadcast transmission
        Announcement period:
            Recommended periodicity of unsolicited transmissions
        Time to live:
            The instance of the Publish function can be commanded to run for a given time interval or for one transmission only
        Event conditions:
            Determines when Publish related events are generated. Events can be requested to be generated on each solicited transmission. Alternatively, no events are expected.

TABLE 7

Subscribe ( service_name, service_specific_info, configuration_parameters )

service_name:
    UTF-8 name string which indentifies the service/application
service_specific_info:
    Sequence of values which should be conveyed to the Discovery Engine of a NAN Device that has invoked a Subscribe method corresponding to this Publish method.
    configuration_parameters
        Subscribe type:
            Determines the type of Subscribe as follows
            Passive: A NAN device passively performs Subscribe in the interior of a NAN DE
            Active: A NAN device actively performs Subscribe to a proxy server
        Discovery range:
            Determines whether the service is searched in close proximity only or in any NAN Devices within range
        Query period:
            Recommended periodicity of query transmissions
        Time to live:
            The instance of the Subscribe function can be commanded to run for a given time interval or until the first DiscoveryResult eventRecommended periodicity of unsolicited transmissions As another example, the second NAN device 1030 may newly define primitives of a method called for registration. That is, the service/application end of the second NAN device 1030 may transmit a newly defined proxy registration (ProxyRegistration) method to the NAN DE and NAN MAC end of the second NAN device 1030 to provide information about proxy registration. Herein, primitives of the newly defined proxy registration method may be as indicated in Table 8 below.

TABLE 8

ProxyRegistartion(service_name, service_specific_info, configuration_parameters)

service_name:
    UTF-8 name string which identifies the service/application
service_specific_info:
    Sequence of values which should be conveyed to the Discovery Engine of a NAN Device that has invoked a Subscribe method corresponding to this ProxyRegistration method.
    configuration_parameters
        ProxyRegistration type:
            Solicited transmissions only and Unsolicited transmission
        Solicited transmission type:
            Determines whether a solicited transmission is a unicast or a broadcast transmission
        Announcement period:
            Recommended periodicity of unsolicited transmissions
        Time to live:
            The instance of the Publish function can be commanded to run for a given time interval or for one transmission only
        Event conditions:
            Determines when ProxyRegistration related events are generated. Events can be requested to be generated on each solicited transmission. Alternatively, no events are expected.

That is, the service/application end of the second NAN device 1030 may provide a method for registration with the NAN proxy server to the NAN DE and NAN MAC end of the second NAN device 1030. In this case, the provided method may use the existing publish method format and include information about proxy registration. For example, the method may be the newly defined method for proxy registration but the present invention is not limited to the above-described embodiment.

Next, the NAN DE and NAN MAC end of the second NAN device 1030 may transmit a proxy registration request to the NAN proxy server 1020. The proxy registration request may be a publish message. For example, the proxy registration request may be a service discovery frame, the type of which is "publish". Herein, a service discovery attribute of the proxy registration request may be, for example, as indicated in Table 9 below.

TABLE 9

| Field | Size (Octets) | Value (Hex) | Description |
| --- | --- | --- | --- |
| Attribute ID | 1 | 0x03 | Identifies the type of NAN attribute |
| Length | 2 | Variable | Length of the following fields in the attribute. |
| Service ID* | 6 | Variable | Mandatory field that contains the hash of the Service Name. |
| Instance ID | 1 | Variable | Publish_ID or Subscribe_ID |
| Requestor Instance ID | 1 | Variable | Instance ID from the frame that triggered the transmission if available, otherwise set to 0x00. |
| Service Control | 1 | Variable | Mandatory field that defines the Service Control bitmap |
| Binding Bitmap | 0 or 2 | 0x0000 to 0xFFFF | Optional field that indicates the binding of the SDA to post discovery connection attributes |

TABLE 9-continued

| Field | Size (Octets) | Value (Hex) | Description |
| --- | --- | --- | --- |
| Service Response Filter Length | 0 or 1 | Variable | An optional field and present if a service response filter is used. |
| Service Response Filter | Variable | Variable | An optional field that is a sequence of length and value pairs that identify the matching service response filters |
| Service Info Length | 0 or 1 | Variable | An optional field and present if service specific information is used |
| Service Info | Variable | Variable | An optional field that contains the service specific information. Its content may be determined by the application and not specified herein. |

In this case, a Service ID field in the following fields included in the proxy registration request may be a mandatory field. The Service ID field may be defined as a proxy service ID as a service provided by the NAN proxy server. The proxy registration request fields may also include information needed when a NAN device is registered with the NAN proxy server. For example, as a field included in the proxy registration request, a Service Info field may include a proxy registration request TLV (type, length, values). The proxy registration request TLV may be as indicated in Table 10. For example, the proxy registration request TLV may include an Availability Time field indicating a discovery window (DW) duration in which the NAN device is awoken after being registered as a proxy client. The proxy registration request TLV may also include a Service ID field indicating an ID of a service that the NAN device requests the NAN proxy server to provide. The proxy registration request TLV may also include information needed when the NAN device is registered with the NAN proxy server. However, the present invention is not limited to the above-described embodiment.

TABLE 10

| Field | Size (Octets) | Value (Hex) | Description |
| --- | --- | --- | --- |
| Type | 1 | Variable | Type code of the Proxy Registration Request TLV |
| Length | 2 | Variable | Length of the Proxy Registration Request TLV (not including the Type and Length fields) |
| Availability Time | 1 | Variable | Indicates bitmap for the DW Awake Duration of Proxy Client (DW could be presented from DW0 to DW15 with bitmap pattern) If bitmap bit is set as 0, Proxy Client is sleep, otherwise bitmap bit is set as 1, Proxy Client is awake, e.g., when DW awake duration is DW1 and DW2, bitmap is presented as 011000000000000. |
| Time to live | 1 | Variable | Indicates TTL of Proxy client's service |
| Service ID | 6 | Variable | Indicates the requesting service ID |
| Instance ID | 1 | Variable | Publish_ID or Subscribe_ID |
| Requestor Instance ID | 1 | Variable | Instance ID from the frame that triggered the transmission if available, otherwise set to 0x00 |
| Service Control | 1 | Variable | Mandatory field that defines the Service Control bitmap |
| Binding Bitmap | 0 or 2 | 0x0000 to 0xFFFF | Optional field that indicates the binding of the SDA to post discovery connection attributes |
| Service Response Filter Length | 0 or 1 | Variable | An optional field and present if a service response filter is used |

TABLE 10-continued

| Field | Size (Octets) | Value (Hex) | Description |
|---|---|---|---|
| Service Response Filter | Variable | Variable | An optional field that is a sequence of length and value pairs that identify the matching service response filters |
| Service Info Length | 0 or 1 | Variable | An optional field and present if service specific information is used |
| Service Info | Variable | Variable | An optional field that contains the service specific information. Its content may be determined by the application and not specified herein. |

Next, the NAN proxy server may transmit a proxy registration response to the proxy registration request to the second NAN device 1030. Herein, the proxy registration response may be a publish message. The proxy registration response may be a service discovery frame, the type of which is "publish". A service discovery attribute of the proxy registration response may be as indicated in Table 9 above.

In the following fields included in the proxy registration response, a Service ID field may be a mandatory field. The Service ID field may indicate an ID of a service provided by the NAN proxy server and may be defined as a proxy service ID. The fields included in the proxy registration response may include information needed when the NAN device is registered with the NAN proxy server. For example, a Service Info field among the fields included in the proxy registration response may include a proxy registration request TLV. In this case, the proxy registration response TLV may be as indicated in Table 11 below. Herein, the proxy registration response TLV may include a Status indication field indicating whether the NAN proxy server grants registration of the NAN device. For example, if the Status indication field is set to 0, registration of the NAN device may be granted. The Status indication field may also be set to 1 or 2 indicating that registration of the NAN device is rejected for different reasons. In addition, the proxy registration response TLV may include a Registration ID field indicating a registration ID. The proxy registration response may include a Service ID field indicating an ID of a service provided by the NAN proxy server. Further, the NAN proxy response TLV may include information necessary when the NAN device is registered with the NAN proxy server and the present invention is not limited to the above-described embodiment.

TABLE 11

| Field | Size (Octets) | Value (Hex) | Description |
|---|---|---|---|
| Type | 1 | Variable | Type code of the Proxy Registration Response TLV |
| Length | 2 | Variable | Length of the Proxy Registration Response TLV (not including the Type and Length fields) |
| Status indication | 1 | Variable | If set to 0, Proxy registration is accept, otherwise set to 1 is fail due to requested information not available, and set to 2 is fail due to bad request |
| Registration ID | 1 | Variable | Indicates the Registration ID of requested service |
| MAC Address of matched device | 6 | Variable | Indicates the MAC Address of service matched device on a remote NAN Device |

TABLE 11-continued

| Field | Size (Octets) | Value (Hex) | Description |
|---|---|---|---|
| Service ID | 6 | Variable | Responses the requesting service ID |
| Time to live | 1 | Variable | Indicates TTL of Proxy Server |
| Watchdog timer | 1 | Variable | Indicates Watchdog timer value |

Next, upon receiving confirmation from the NAN proxy server 1020, the NAN DE and NAN MAC end of the second NAN device 1030 may provide a discovery result event to the service/application end of the second NAN device 1030. For example, if the proxy registration response having the Status indication field set to 1 (??0) is received, this may indicate that registration has been confirmed. Thereafter, the second NA device 1030 may become a NAN proxy client registered with the NAN proxy server based on the discovery result event.

Through the above-described procedure, the NAN device may become the NAN proxy client registered with the NAN proxy server.

Figure 11:
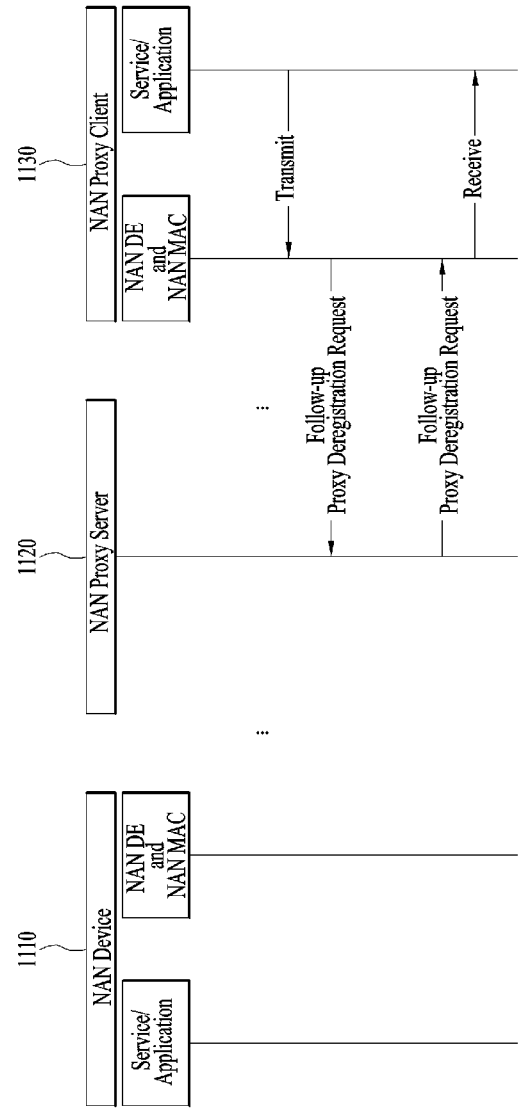
FIG. 11 is a diagram illustrating a method for a NAN proxy client registered with a NAN proxy server to perform deregistration.

FIG. 11 is a diagram illustrating a method for a NAN proxy client registered with a NAN proxy server to perform deregistration.

A NAN proxy client 1130 may remain registered with a NAN proxy server 1120. In this case, the NAN proxy client 1130 may be deregistered from the NAN proxy server 1120. For example, the NAN proxy client 1130 may be deregistered from the NAN proxy server 1120 based on a coverage problem or a power consumption problem. However, the present invention is not limited to the above-described embodiment.

If the NAN proxy client 1130 desires to be deregistered from the NAN proxy server 1120, a service/application end of the NAN proxy client 1130 may call a method to provide the method to a NAN DE and NAN MAC end of the NAN device 1130. In this case, the called method may use a format of an existing follow-up transmit method. In addition, the method may be a newly defined proxy deregistration method. That is, a method for proxy deregistration may be called. However, the present invention is not limited to the above-described embodiment.

The follow-up transmit method may be as indicated in Table 12 below. In addition, as the case in which the method is newly defined, the proxy deregistration method may be as indicated in Table 13 below. Herein, the method may include information about an ID.

If the existing follow-up transmit method is used, Service_specific_info may include registration_id and a proxy server address. That is, information necessary for proxy deregistration may be included in Service_specific_info while an existing format is used.

Meanwhile, registration_id and the proxy server address may be independently provided in the newly defined proxy deregistration method.

TABLE 12

Transmit( handle, service_specific_info, configuration_parameters)

Handle:
    A valid publish_id or subscribe_id which has been originally returned by an instance of the Publish function or the Subscribe function respectively
    Service_specific_info:
        Sequence of values which are to be transmitted in the frame body
    Configuration_parameters
        NAN Interface Address:
            MAC address of the NAN Device to which the frame is destined to
        Requestor Instance ID:
            Identifier of the instance of the Publish function or the Subscribe function in the NAN Device to which the follow-up message is destined to
        Priority:
            Requested relative priority of the transmissions

TABLE 13

DeRegistration ( handle, service_specific_info, configuration_parameters , registration_id, proxy_server_address)

Handle:
    A valid publish_id or subscribe_id which has been originally returned by an instance of the Publish function or the Subscribe function respectively
    Service_specific_info:
        Sequence of values which are in be transmitted in the frame body
    Configuation_parameters
        NAN Interface Address:
            MAC address of the NAN Device to which the frame is destined to
        Requestor Instance ID:
            Identifier of the instance of the Publish function or the Subscribe function in the NAN Device to which the follow-up message is destined to
        Priority:
            Requested relative priority of the transmissions
    Registration_id :
        ID value received during service registration with a proxy server
    Proxy Server Address :
        Address of a proxy server Next, the NAN proxy client 1130 may transmit a follow-up message to the NAN proxy server 1120. The follow-up message may be a follow-up proxy deregistration request message. That is, the NAN proxy client 1130 may transmit a message for proxy deregistration to the NAN proxy server 1120 based on the called method.

A TLV field of the follow-up proxy deregistration request message may be as indicated in Table 14 below. That is, the follow-up proxy deregistration request message may include information about a registration ID and information about a MAC address of a NAN proxy server. The NAN proxy server 1120 may identify a registered NAN proxy client and perform a proxy deregistration procedure, through the information included in the follow-up proxy deregistration request message.

TABLE 14

| Field | Size (Octets) | Value (Hex) | Description |
|---|---|---|---|
| Type | 1 | Variable | Type code of the Proxy Deregistration Request TLV |
| Length | 2 | Variable | Length of the Proxy Deregistration Request TLV (not including the Type and Length fields) |
| Registration ID | 1 | Variable | Indicates the Registration ID of requested service |
| MAC Address of proxy server | 6 | Variable | Indicates the MAC Address of Proxy server on a remote NAN Device |

Thereafter, the NAN proxy client 1130 may receive a follow-up message from the NAN proxy server 1120. The follow-up message may be a follow-up proxy deregistration response message. That is, the NAN proxy client 1130 may receive a message for proxy deregistration as a response to the proxy deregistration request from the NAN proxy server 1120. A TLV field of the follow-up proxy deregistration response message may be as indicated in Table 15 below. The follow-up proxy deregistration response message may include information about a registration ID field and information about a status indication field indicating whether deregistration is accepted.

TABLE 15

| Field | Size (Octets) | Value (Hex) | Description |
|---|---|---|---|
| Type | 1 | Variable | Type code of the Proxy Deregistration Request TLV |
| Length | 2 | Variable | Length of the Proxy Deregistration Request TLV (not including the Type and Length fields) |
| Status indication | 1 | Variable | If set to 0, Proxy deregistration is accept, otherwise set to 1 is fail |
| Registration ID | 1 | Variable | Indicates the Registration ID of requested service |

Next, the NAN DE and NAN MAC end of the NAN proxy client 1130 may provide a follow-up receive event to the service/application end of the NAN proxy client 1130. The follow-up receive event may be as indicated in Table 16 below. The NAN proxy client 1130 may end a proxy deregistration procedure by omitting the follow-up receive event.

TABLE 16

Receive (peer_instance_id, service_specific_info, address )

peer_instance_id:
    Identifier of the Publish function or the Subscribe function in the NAN Device from which this follow-up message was received.
service_specific_info:
    Sequence of values which were decoded from the received frame
Address:
    NAN Interface Address of the NAN Device from which the frame was received
Receive_status:
    Receiving status of Follow-up message. In this case for proxy registration update response, receive_status means update status.

As another example, the NAN proxy server 1120 may release a role as a proxy server. In this case, the NAN proxy server 1120 may transmit a proxy deregistration notification to a registered NAN proxy client 1130. The proxy deregistration notification may be provided through unicast or broadcast transmission. However, the present invention is not limited to the above-described embodiment. That is, when the NAN proxy server 1120 releases the role of the proxy server, the NAN proxy server 1120 may transmit a message indicating that the role of the proxy server is released to the NAN proxy client 1130. A TLV field of the proxy deregistration notification may be as indicated in Table 17 below. The TLV field of the proxy deregistration notification may include a registration ID. Through the registration ID, the NAN proxy client 1130 may identify the NAN proxy server 1120 that is released and perform a proxy deregistration procedure.

TABLE 17

| Field | Size (Octets) | Value (Hex) | Description |
|---|---|---|---|
| Type | 1 | Variable | Type code of the Proxy Deregistration Request TLV |
| Length | 2 | Variable | Length of the Proxy Deregistration Request TLV (not including the Type and Length fields) |
| Registration ID | 1 | Variable | Indicates the Registration ID of requested service |

As another example, the NAN proxy client 1130 may request that the NAN proxy server 1120 transmit update information of a proxy service. Herein, if there is no response to an update request of N times, the NAN proxy client 130 may determine that the NAN proxy server 1120 is no longer present even when the NAN proxy client does not receive the proxy deregistration notification. Herein, N may be a preset number which is variable. The update request of N times may be vendor-specifically defined. The update request of N times may be differently configured according to service and the present invention is not limited to the above-described embodiment.

Figure 12:
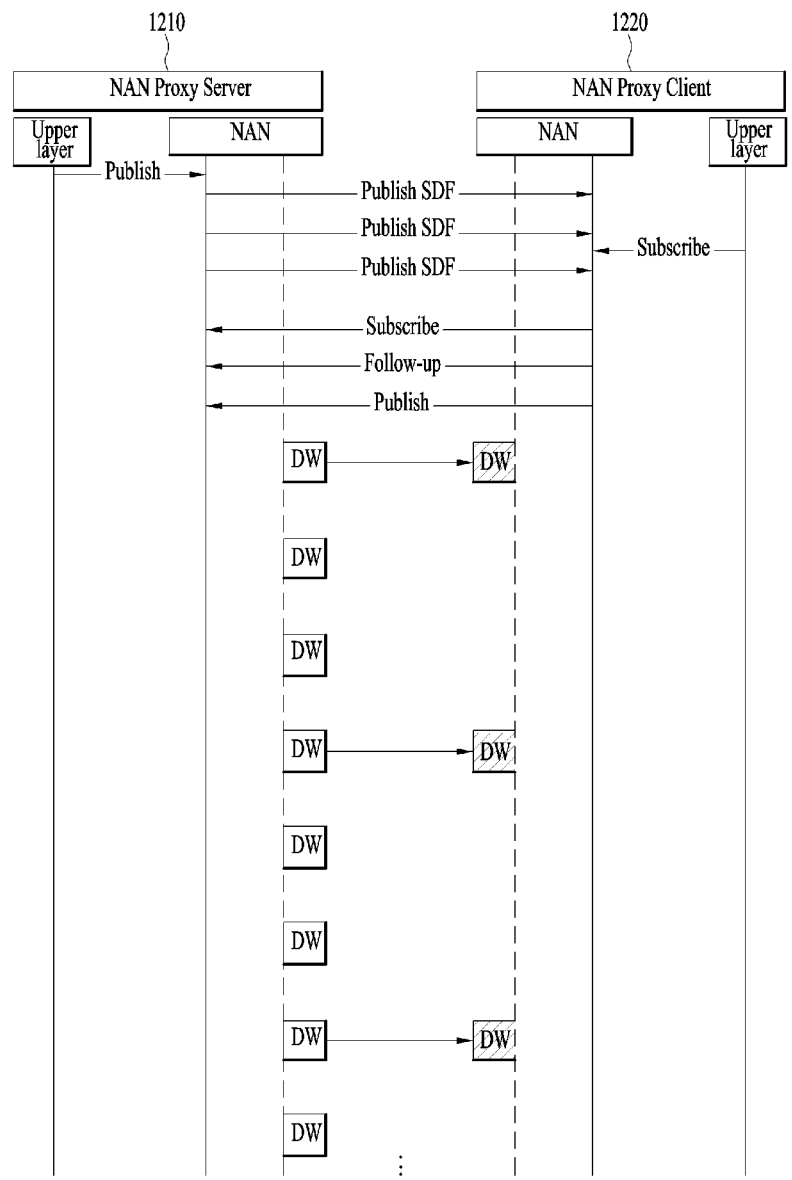
FIG. 12 is a diagram illustrating a discovery window period of a NAN proxy server and a NAN proxy client.

FIG. 12 is a diagram illustrating a discovery window period of a NAN proxy server and a NAN proxy client.

As mentioned in the foregoing description, a mechanism for performing data transmission of NAN devices and reducing power consumption may be supported using the NAN proxy server. Two NAN devices that cannot communicate with each other due to a coverage problem may perform communication using the NAN proxy server. In addition, the NAN proxy client may not be awoken in every discovery window and, therefore, power consumption is reduced.

As described above, the NAN device may transmit a subscribe message to the NAN proxy server to perform service discovery of the NAN proxy server. To transmit the subscribe message to the NAN proxy server, the NAN device needs to identify the NAN proxy server. That is, the NAN device needs to check whether the NAN proxy server is present.

Herein, the NAN proxy server may inform the NAN device that itself is a NAN proxy server by publishing a service discovery frame in a broadcast form. For example, a publish type of the publish message may be "solicited" or "unsolicited". However, the present invention is not limited to the above-described embodiment.

In addition, in order for the NAN proxy server to inform the NAN device that the NAN proxy server has the capability to act as a proxy server, the NAN proxy server may add a proxy server attribute in a NAN beacon or a service discovery frame. In this case, among NAN devices that receive the NAN beacon or service discovery frame including the proxy server attribute, a device supporting a proxy client function may confirm the presence of the proxy server in the vicinity thereof by interpreting the attribute.

More specifically, Table 18 shows NAN attribute information included in the beacon frame and service discovery frame. In Table 18, an Attribute ID field may be defined as different values to indicate different attributes. Each attribute may be included or may not be included in the beacon frame and service discovery frame. For example, a specific one of attributes may be expressed as a mandatory attribute (represented as "M" in the table) or an optional attribute (represented as "O" in the table).

Among fields for the NAN attribute information, at least one of a proxy server attribute field and a proxy client attribute field may be defined in reserved bits. For example, the proxy server attribute field may be selectively included in at least one of a NAN synchronization beacon frame, a NAN discovery beacon frame, and a NAN service discovery frame. That is, the proxy server attribute field may be a field defined to inform NAN devices of the presence of the NAN proxy server and may be selectively included in each frame.

Meanwhile, the proxy client attribute field may be selectively included in a service discovery frame. That is, the proxy client attribute field may indicate information transmitted based on determination as to whether a NAN device may become a NAN proxy client as a result of checking the presence of the NAN proxy server. Accordingly, the proxy client attribute field may be transmitted in a NAN service discovery window rather than in a NAN beacon frame.

TABLE 18

| Attribute | | NAN Beacons | | |
|---|---|---|---|---|
| ID | Description | Sync | Discovery | NAN SDF |
| 0 | Master Indication Attribute | YES/M | YES/M | NO |
| 1 | Cluster Attribute | YES/M | YES/M | NO |
| 2 | Service ID List Attribute | YES/O | YES/O | NO |
| 3 | Service Descriptor Attribute | NO | NO | YES/M |
| 4 | NAN Connection Capability Attribute | NO | NO | YES/O |
| 5 | WLAN infrastructure Attribute | NO | NO | YES/O |
| 6 | P2P Operation Attribute | NO | NO | YES/O |
| 7 | IBSS Attribute | NO | NO | YES/O |
| 8 | Mesh Attribute | NO | NO | YES/O |
| 9 | Further NAN Service Discovery Attribute | NO | NO | YES/O |
| 10 | Further Availability Map Attribute | NO | NO | YES/O |
| 11 | Country Code Attribute | YES/O | YES/O | YES/O |
| 12 | Ranging Attribute | NO | NO | YES/O |
| 13 | Cluster Discovery Attribute | NO | NO | NO |

TABLE 18-continued

| Attribute | | NAN Beacons | | |
|---|---|---|---|---|
| ID | Description | Sync | Discovery | NAN SDF |
| 14(TBD) | Proxy Server Attribute | YES/O | YES/O | YES/O |
| 15(TBD) | Proxy Client Attribute | NO | NO | YES/O |
| 16-220 | Reserved | NA | NA | NA |
| 221 | Vendor Specific Attribute | YES/O | YES/O | YES/O |
| 222-255 | Reserved | NA | NA | NA |

The proxy server attribute field may be configured as indicated in Table 19 below. More specifically, the proxy server attribute field may include a Proxy Server Address field including address information of a NAN interface of the proxy server. The proxy server attribute field may also include a Proxy Server Capability field indicating information about capabilities of the NAN proxy server. Herein, a function of the NAN proxy server may be included in a bitmap form. An awake interval of the NAN proxy server may be represented as an integer value. The integer value indicates a discovery window interval at which the NAN proxy server is awoken. That is, if the integer value is 1, the NAN proxy server may be awoken at every discovery window interval. Herein, the NAN proxy server may serve as the NAN proxy client and may be awoken at every discovery window.

If it is necessary to reduce power consumption of the NAN proxy server, the integer value may be changed. However, the present invention is not limited to the above-described embodiment. When the NAN proxy server provides a function of an AP STA as well, a BSSID field may be included as the AP STA.

TABLE 19

| Field | Size (octets) | Value | Description |
|---|---|---|---|
| Attribute ID | 1 | 0x14 | Identifies the type of NAN attribute. (TBD) |
| Length | 2 | Variable | Length of the following fields in the attribute. |
| Proxy Server Address | 6 | Variable | NAN Interface address of NAN Proxy Server |
| Proxy Server Capability | 1 | Variable | Capability of Proxy Server |
| Awake Interval | 1 | 1-255 | DW interval of this Proxy Server |
| BSSID | 6 | Variable | BSSID which is support by Proxy Service if capable. |

A bitmap of the above-described Proxy Server Capability field may be as indicated in Table 20 below. More specifically, in the proxy server capability bitmap, a Publish Proxy bit may indicate whether the NAN proxy server supports a function of receiving a publish request of a neighbor NAN device and performing proxy service publish transmission. A Subscribe Proxy bit may indicate whether the NAN proxy server supports a function of receiving a subscribe request of a neighbor NAN device, searching for a neighbor service, and informing the NAN device of the searched service. A Follow-up Proxy bit indicates whether the NAN proxy server supports a proxy function of a follow-up service discovery frame of a neighbor NAN device. An Invite Proxy bit indicates whether the NAN proxy server supports a function of requesting that neighbor NAN devices participate in a BSS of an AP STA of the NAN proxy server. A NAN Data Path bit may indicate whether the NAN proxy server supports a function of a NAN data path. A NAN Data Forwarding bit may indicate whether the NAN proxy server supports a function of receiving a NAN data path of the NAN device and transmitting the NAN data path to neighbor NAN devices. That is, the Proxy Server Capability field may indicate information about a function that the NAN proxy server supports. However, the present invention is not limited to the above-described embodiment.

TABLE 20

| Bit(s) | Information | Notes |
|---|---|---|
| 0 | Publish Proxy | Publish Proxy bit shall be set, if a Proxy server supports proxy a Publish request form Proxy client, and is set to 0 otherwise. |
| 1 | Subscribe Proxy | Subscribe Proxy bit shall be set, if a Proxy server supports proxy a Subscribe request form Proxy client, and is set to 0 otherwise. |
| 2 | Follow-up Proxy | Follow-up Proxy bit shall be set, if a Proxy server supports proxy a Follow-up request form Proxy client, and is set to 0 otherwise. |
| 3 | Invite Proxy | Follow-up Proxy bit shall be set, if a Proxy server supports to invite other NAN device to its own BSS, and is set to 0 otherwise. |
| 4 | NAN Data Path | NAN Data Path bit shall be set, if a Proxy server supports NAN data path capability, and is set to 0 otherwise. |
| 5 | NAN Data Forwarding | NAN Data Forwarding bit shall be set, if a Proxy server supports NAN data forwarding from a NAN device to other, and is set to 0 otherwise |
| 6-7 | Reserved | — |

Table 21 shown below indicates a format of the proxy client attribute. More specifically, the proxy client attribute may be included in a service discovery frame that the NAN proxy client transmits to the NAN proxy server. The proxy client attribute may include a proxy client address indicating a NAN interface address of the NAN proxy client. The proxy client attribute may also include a proxy server address indicating a NAN interface address of the NAN proxy server. In addition, the proxy client attribute may include an awake interval indicating an awake interval of a discovery window. The awake interval may indicate an awake interval at which the NAN proxy client is awoken in units of discovery window intervals after the NAN proxy client requests the NAN proxy server to perform publishing, subscribing, and following-up.

For example, referring to FIG. 12, the NAN proxy client may request that the NAN proxy server perform publishing and set the awake interval of the proxy client attribute to 3. In this case, the NAN proxy client may be awoken every three discovery windows after being registered with the NAN proxy server. That is, the NAN proxy client may be awoken in the first discovery window, the fourth discovery window, and the seventh discovery window. The NAN proxy client may be awoken at the same interval. Next, when the NAN proxy client needs to be connected with the NAN proxy server, the NAN proxy client may transmit the subscribe message to the NAN proxy server as described above. The NAN proxy client may transmit follow-up to the NAN proxy server to perform a role with the NAN proxy server. The NAN proxy client may perform publishing to inform the NAN proxy server of a service provided thereby.

An awake interval of the discovery window may be determined according to features or definition of the NAN proxy client. An address of the proxy server and the awake interval of the discovery window may be additionally defined in legacy publishing. Then, the NAN proxy client may entrust a publishing role thereof to the NAN proxy server. That is, the NAN proxy client may be awoken only in a discovery window of a specific interval and synchronized with the NAN proxy server, thereby reducing power consumption.

In this case, the NAN proxy client may always be awoken at a multiple of the awake interval of the NAN proxy server. That is, the NAN proxy client may be awoken only in a discovery window of a predetermined interval based on the awake interval. The NAN proxy server may always be awoken in a discovery window in which the NAN proxy client is awoken, thereby performing data exchange with the NAN proxy client. Thus, the NAN proxy client may perform data communication with other devices while reducing power consumption using the NAN proxy server.

TABLE 21

| Field | Size (octets) | Value | Description |
|---|---|---|---|
| Attribute ID | 1 | 0x15 | Identifies the type of NAN attribute. (TBD) |
| Length | 2 | Variable | Length of the following fields in the attribute. |
| Proxy Client Address | 6 | Variable | NAN Interface address of NAN device |
| Proxy Server Address | 6 | Variable | NAN Interface address of target NAN Proxy server |
| Awake Interval | 1 | Variable | Wake up interval of this Proxy Client (unit of DW interval) |
| BSSID | 6 | Variable | BSSID which is support by Proxy Service |

Figure 13:
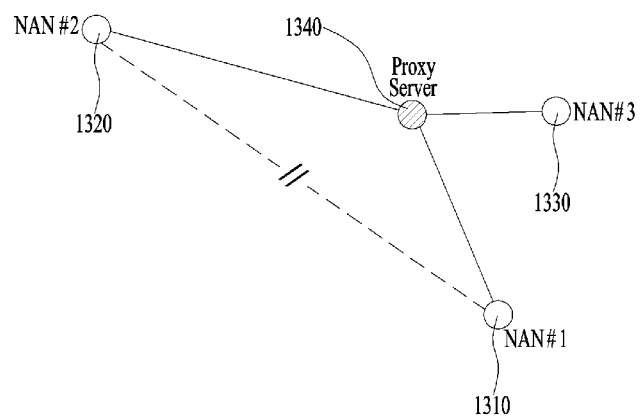
FIG. 13 is a diagram illustrating a method for a NAN proxy server to support a NAN device.

FIG. 13 is a diagram illustrating a method for a NAN proxy server to support a NAN device.

The NAN proxy server may support not only the NAN proxy client but also other NAN devices. For example, if the NAN proxy server is a device having a function of an AP, the NAN proxy server may perform publishing by including AP capability information and WLAN information attributes in a service discovery frame.

As described previously, the NAN proxy client may perform registration after discovering the NAN proxy server. Next, the NAN proxy server may be configured to perform publishing in place of the NAN proxy client. For example, the NAN proxy server may perform publishing in place of the NAN proxy client, thereby performing data communication with other NAN devices.

However, referring to FIG. 13, two NAN devices may not perform communication due to a coverage problem. In this case, the NAN proxy server may transmit a service discover frame including invite information to the two NAN devices. The invite information may be information for causing the NAN devices to join in a data path using WLAN infrastructure belonging to a BSS of the NAN proxy server.

For example, each of a first NAN device 1310 and a second NAN device 1320 may be a NAN proxy client registered with a NAN proxy server 1340. Although the first NAN device 1310 and the second NAN device 1320 may identify each other through the NAN proxy server 1340, direct data communication therebetween may not be possible due to a coverage therebetween. The NAN proxy server 1340 may support a function of the AP STA as mentioned previously. When the NAN proxy server 1340 supports the function of the AP STA, the NAN proxy server 1340 may inform the first NAN device 1310 and the second NAN device 1320 of a BSS of an AP to perform communication through the AP. That is, when the NAN proxy server 1340 supports the AP, the NAN proxy server 1340 may cause the NAN devices to perform data communication using WLAN infrastructure.

Figure 14:
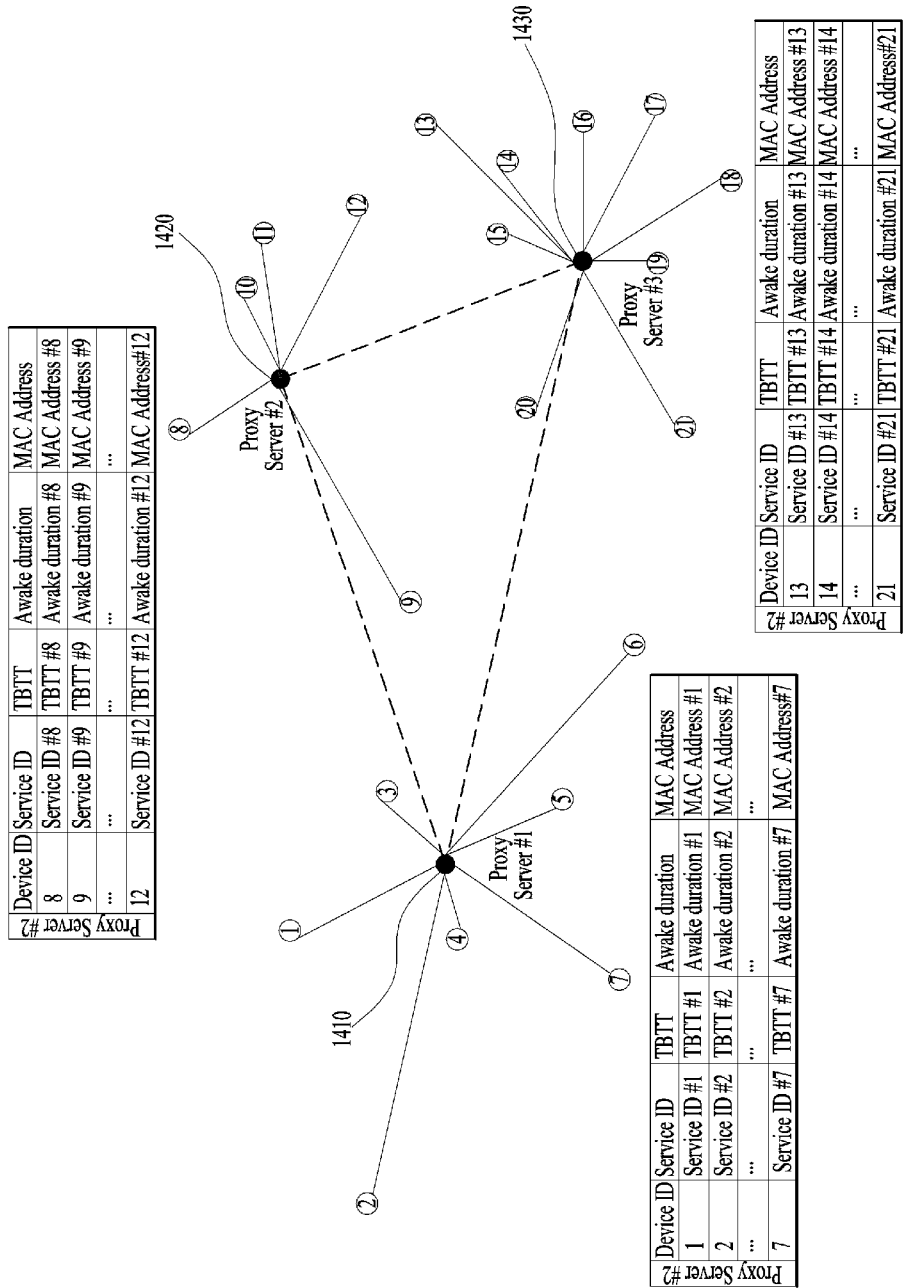
FIG. 14 is a diagram illustrating a method of managing NAN proxy clients registered with a plurality of NAN proxy servers.

FIG. 14 is a diagram illustrating a method of managing NAN proxy clients registered with a plurality of NAN proxy servers.

A NAN proxy client may be registered with a NAN proxy server as described above. Then, the NAN proxy server may perform publishing and/or subscribing in place of the NAN proxy client. The NAN proxy client may be awoken only in a discovery window of a predetermined interval and receive information from the NAN proxy server, thereby reducing power consumption.

Referring to FIG. 14, NAN proxy servers 1410, 1420, and 1430 may include respective NAN proxy clients. The number of NAN proxy clients registered with a NAN proxy server may be one or more. The number of NAN proxy clients registered with a NAN proxy server may be limited to a specific value but the present invention is not limited to the above-described embodiment. The NAN proxy servers 1410, 1420, and 1430 may be adjacent and may exchange a service discovery frame with each other. In other words, a plurality of NAN proxy servers 1410, 1420, and 1430 including NAN proxy clients registered therewith may be present. However, the present invention is not limited to the above-described embodiment.

Herein, it is necessary to maintain a relationship between a NAN proxy server and a NAN proxy client and update the relationship. As described previously, in order for the NAN proxy client to be deregistered from the NAN proxy server, the NAN proxy client may perform a deregistration procedure by transmitting a deregistration message to the NAN proxy server.

In addition, the NAN proxy server may perform deregistration of the NAN proxy client. Herein, the case in which the NAN proxy server stops a role as a proxy server or leaves off from the role as the NAN proxy server may be considered. In some cases, the NAN proxy server may be turned off so that the NAN proxy server cannot perform a role thereof. In this case, the NAN proxy client registered with the NAN proxy server may not smoothly perform data communication. For smooth data communication of the NAN proxy client, it is necessary to consider maintenance and updating of the NAN proxy client.

If the NAN proxy server exits from a region thereof or stops a role thereof, the NAN proxy server may provide information about stopping of the role to the NAN proxy client. The NAN proxy server may provide such information to NAN proxy clients by broadcasting the information about stopping of the role in a service discovery frame. Notably, the NAN proxy clients may be awoken only in a discovery window of a predetermined interval. Each of the proxy clients may be awoken in a discovery window of a different interval. Accordingly, the NAN proxy clients may not receive the information about stopping of the role broadcast by the NAN proxy server.

In this case, the NAN proxy server may transmit the information about stopping of the role to a neighbor NAN proxy server. The NAN proxy server that stops the role (hereinafter, an old NAN proxy server) may provide NAN proxy client list information to a neighbor NAN proxy server (hereinafter, a new NAN proxy server). The old NAN proxy server may provide discovery window interval information of the NAN proxy clients to the new NAN proxy server. In this case, in place of the old NAN proxy server, the new NAN proxy server may provide the NAN proxy clients with information indicating that a NAN proxy server has been changed.

The case in which the NAN proxy server is abruptly turned off may be considered. In this case, a NAN proxy client may operate while the NAN proxy client does not receive the information indicating that the NAN proxy server does not operate. Therefore, the NAN proxy client may confirm that the NAN proxy server does not operate based on an update interval. That is, the NAN proxy client attempts to establish synchronization with the NAN proxy server in a discovery window in which the NAN proxy client is awoken. If synchronization fails, the NAN proxy client may confirm that the NAN proxy server does not operate. For example, if the NAN proxy client fails to be synchronized with the NAN proxy server in a discovery window of N times, the NAN proxy client may confirm that the NAN proxy server does not operate. Herein, N may be a variable value and the present invention is not limited to the above-described embodiment.

If the NAN proxy client confirms that the NAN proxy server does not operate, the NAN proxy client may perform a procedure for performing re-registration with another NAN proxy server. That is, the NAN proxy client may search for a new NAN proxy server and perform registration with the new NAN proxy server.

Among a plurality of NAN proxy clients registered with the NAN proxy server, a NAN proxy client that confirms first that the NAN proxy server does not operate may provide information about stopping of operation of the NAN proxy server to the other NAN proxy clients. That is, the NAN proxy client may provide the information about stopping of operation to the other NAN proxy clients registered with the same NAN proxy server. The information about stopping of operation may be transmitted in a broadcast form. The information about stopping of operation may also be transmitted based on a registration ID of the NAN proxy server. That is, the NAN proxy client that first acquires the information about stopping of operation may provide the information to the other NAN proxy clients. Thus, the other NAN proxy clients may acquire the information about stopping of operation without delay.

Alternatively, the NAN proxy client that first confirms that the operation of the NAN proxy server has been stopped may provide the information about stopping of operation to another NAN proxy server in the vicinity thereof. For example, the NAN proxy client may provide the information about stopping of operation to another NAN proxy server based on registration ID information. If the NAN proxy client includes information about NAN proxy clients registered with the NAN proxy server, the NAN proxy client may provide this information to another NAN proxy server. Upon receiving the information about stopping of operation, the NAN proxy server may perform a role as a new NAN proxy server in place of an old NAN proxy server.

If the NAN proxy server manages the NAN proxy clients, the NAN proxy server may receive information about the NAN proxy clients.

More specifically, NAN proxy clients registered with the NAN proxy server may have different discovery window intervals. If a NAN proxy client is awoken in a specific discovery window, the NAN proxy client may receive a service discovery frame transmitted by the NAN proxy server. Then, the NAN proxy client may acquire information about publishing and/or subscribing performed by a NAN proxy server. Herein, the NAN proxy client may transmit a message (hereinafter, a Keep Alive message) indicating that the NAN proxy client is maintained as the NAN proxy client to the NAN proxy server. The NAN proxy server may update list information about registered NAN proxy clients based on the received Keep Alive message.

The Keep Alive message may be one example and the NAN proxy server may update the list information about the registered NAN proxy clients upon receiving any message indicating that the NAN proxy client is maintained as the NAN proxy client. In other words, the message is not limited to the Keep Alive message and may be a similar message or a newly defined message. That is, the present invention is not limited to the above-described embodiment.

The NAN proxy server may determine whether to maintain registration depending on whether the Keep Alive message is received from each NAN proxy client and may update a list.

Each of the NAN proxy server and the NAN proxy client may perform deregistration. If the NAN proxy server performs deregistration, the NAN proxy server may transmit information about deregistration to the registered NAN proxy clients. If the NAN proxy clients do not receive any message from the NAN proxy server during a discovery window of a predetermined interval, the NAN proxy clients may determine that the NAN proxy server is not available, as described above.

Alternatively, if the NAN proxy client desires to perform deregistration, the NAN proxy client may transmit the deregistration information to the NAN proxy server. If the NAN proxy client is changed to be awoken in every discovery window, the NAN proxy client does not require the NAN proxy server and may perform deregistration.

If the NAN proxy client desires to be registered with a new NAN proxy server, the NAN proxy client may request deregistration from an old NAN proxy server. As another example, if the NAN proxy client is turned off, the NAN proxy client may request that the NAN proxy server perform deregistration.

That is, each of the NAN proxy server and NAN proxy client may perform deregistration according to a predetermined condition.

FIG. 15 is a flowchart illustrating a method of performing a proxy role.

A NAN device may transmit a subscribe message to a NAN proxy server in order to search for a service of the NAN proxy server (S1510). As described with reference to FIGS. 10 to 14, a service/application end of the NAN device may call a subscribe method to provide information about a proxy service to a NAN DE and NAN MAC end. Next, the NAN device may receive a publish message from the NAN proxy server (S1520). As described with reference to FIGS. 10 to 14, the NAN proxy server may determine whether the proxy service is supported through service matching based on the information about the proxy service included in the subscribe message. That is, when the NAN proxy server supports the proxy service requested by the NAN device, the NAN proxy service may transmit the publish message to the NAN device after performing service matching. The NAN DE and NAN MAC end of the NAN device may provide a result of discovery to the service/application end of the NAN device. Then, the NAN device may end service search for the NAN proxy server. The NAN device may transmit a proxy registration request message to the NAN proxy server (S1530). As described with reference to FIGS. 10 to 14, the proxy registration request message may include a proxy registration request TLV field. For example, the proxy registration request message may include information about a discovery window awake interval of the NAN device and information about proxy registration of the NAN device. The NAN device may receive a proxy registration response message based on the proxy registration request message (S1540). As described with reference to FIGS. 10 to 14, upon receiving the proxy registration response message, the NAN device may be registered with the NAN proxy server. That is, the NAN device may become a NAN proxy client. The NAN proxy client may be awoken in a discovery window of a preset interval. The NAN proxy server may perform publishing and/or subscribing in place of the NAN proxy client. That is, the NAN proxy server may perform a procedure for performing data communication with other NAN devices in place of the NAN proxy client. The NAN proxy server and NAN proxy client may exchange data in a discovery window in which the NAN proxy client is awoken, as described above.

FIG. 16 is a block diagram of a device.

The device may be a NAN device. For example, the NAN device may be a device serving as a NAN proxy server. Alternatively, the NAN device may be a device serving as a NAN proxy client, as described above.

A device 100 may include a transmission module 110 for transmitting a radio signal, a reception module 130 for receiving a radio signal, and a processor 120 for controlling the transmission module 110 and the reception module 130. The device 100 may perform communication with an external device using the transmission module 110 and the reception module 130. Herein, the external device may be another device. Alternatively, the external device may be a base station. That is, the external device may be a device capable of performing communication with the device 100 and the present invention is not limited to the above-described embodiment. The device 100 may transmit and receive digital data such as content, using the transmission module 110 and the reception module 130. The device 100 may exchange a beacon frame and a service discovery frame using the transmission module 100 and the reception module 130 and the present invention is not limited to the above-described embodiment. That is, the device 100 may exchange information with the external device by performing communication using the transmission module 110 and the reception module 130.

According to an embodiment of the present specification, the processor 120 may transmit a subscribe message for proxy service search to a NAN proxy server using the transmission module 110. Next, the processor 120 may receive a publish message from the NAN proxy server using the reception module 130. The publish message may be a message indicating that a proxy service is supported by the NAN proxy server. The processor 120 may transmit, using the transmission module 110, a proxy registration request message to the NAN proxy server based on the proxy service. Upon receiving a proxy registration response message, a NAN proxy client may be registered with the NAN proxy server. The registered NAN proxy client may be awoken based on a first discovery window interval, thereby reducing power consumption.

The above-described embodiments may be implemented by various means, for example, by hardware, firmware, software, or a combination thereof.

In a hardware configuration, the method according to the embodiments of the present specification may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the exemplary embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein. In addition, while the present invention has been particularly shown and described with reference to exemplary embodiments thereof, various changes in form and detail may be made herein by those of ordinary skill in the art without departing from the spirit and scope of the present invention as defined by the following claims and such modifications and variations should not be understood separately from the technical idea or aspect of the present invention.

Apparatus and method inventions are mentioned in this specification and descriptions of both the apparatus and method inventions may be complementarily applicable to each other.

INDUSTRIAL APPLICABILITY

Although the present invention has been described based on a NAN wireless communication system, the invention is not limited to the NAN wireless communication system and is applicable in the same manner to various wireless systems.

The invention claimed is:

1. A method of performing registration with a neighbor awareness networking (NAN) proxy server by a NAN proxy client in a wireless communication system, the method comprising:
   transmitting a subscribe message for proxy service search to the NAN proxy server;
   receiving a publish message from the NAN proxy server, wherein the publish message is a message indicating that a proxy service is supported by the NAN proxy server;
   transmitting a proxy registration request message to the NAN proxy server based on the proxy service; and
   receiving a proxy registration response message based on the proxy registration request message, wherein, upon receiving the proxy registration response message, the NAN proxy client is registered with the NAN proxy server, and the registered NAN proxy client is awoken based on a first discovery window interval.

2. The method according to claim 1, wherein information about the first discovery window interval is included in the proxy registration request message and is transmitted to the NAN proxy server.

3. The method according to claim 2, wherein the NAN proxy server is awoken based on a second discovery window interval, and wherein the first discovery window interval is set to a multiple of an integer of the second discovery window interval or is a vender-specifically determined specific parameter.

4. The method according to claim 1, wherein the proxy registration response message includes at least one of information indicating whether registration is permitted and information about a registration identification (ID).

5. The method according to claim 1, wherein, upon completing registration of the NAN proxy client, the NAN proxy server performs publish and subscribe functions of the NAN proxy client in place of the NAN proxy client.

6. The method according to claim 1, further comprising:

performing a procedure of deregistration of the NAN proxy client registered with the NAN proxy server.

7. The method according to claim 6, wherein the procedure of deregistration includes:

transmitting a deregistration request message to the NAN proxy server; and receiving a deregistration response message from the NAN proxy server.

8. The method according to claim 1, wherein the NAN proxy client is deregistered from the NAN proxy server and provides information about deregistration to other NAN proxy clients registered with the NAN proxy server when the NAN proxy server is unavailable.

9. The method according to claim 1, further comprising:

receiving a first frame including information about capabilities of the proxy server from the NAN proxy server.

10. The method according to claim 9, wherein the first frame is one of a NAN beacon frame and a NAN service discovery frame.

11. The method according to claim 9, wherein the first frame includes a NAN proxy server attribute field including at least one of a proxy server address field, a proxy server capability field, an awake interval field, and a basic server set (BSS) ID field.

12. The method according to claim 9, further comprising:

transmitting a second frame including information about capabilities of the proxy client to the NAN proxy server upon receiving the first frame, wherein the second frame includes a NAN proxy client attribute field including at least one of a proxy client address field, a proxy server address field, an awake interval field, and a basic server set (BSS) ID field.

13. The method according to claim 1, wherein the registered NAN proxy client receives a first frame from the NAN proxy server in a discovery window awoken based on the first discovery window interval and performs synchronization with the NAN proxy server based on the first frame.

14. The method according to claim 13, further comprising:

transmitting a second frame to the NAN proxy server based on the first frame, wherein the second frame includes information indicating that registration of the NAN proxy client is maintained.

15. A neighbor awareness networking (NAN) proxy client for performing registration with a NAN proxy server in a wireless communication system, the NAN proxy client comprising:

a transmitter and a receiver; and a processor configured to:

control the transmitter to transmit a subscribe message for proxy service search to the NAN proxy server, control the receiver to receive a publish message from the NAN proxy server, the publish message being a message indicating that a proxy service is supported by the NAN proxy server, control the transmitter to transmit a proxy registration request message to the NAN proxy server based on the proxy service, control the receiver to receive a proxy registration response message based on the proxy registration request message, and wherein the NAN proxy client is registered with the NAN proxy server upon receiving the proxy registration response message, and wherein the registered NAN proxy client is awoken based on a first discovery window interval.

* * * * *